F. M. LEWIS.
DIFFERENTIAL MECHANISM.
APPLICATION FILED MAR. 23, 1916.

1,292,818.

Patented Jan. 28, 1919.
2 SHEETS—SHEET 1.

Witnesses
Fulton Lenoir
W. H. DeBusk

Inventor
Frank M. Lewis
Attorney

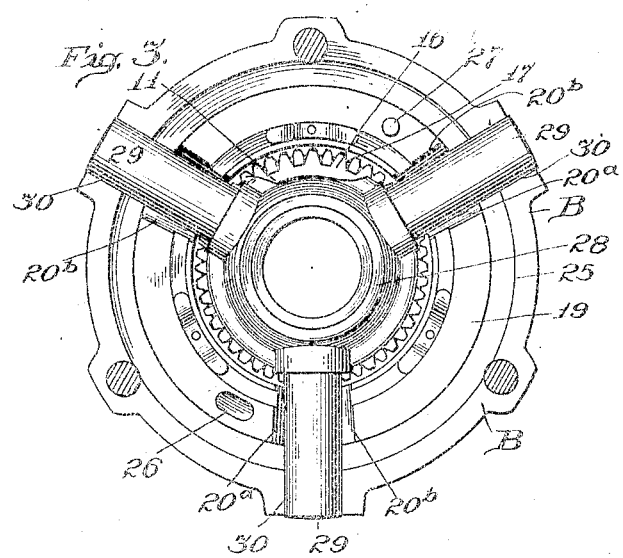
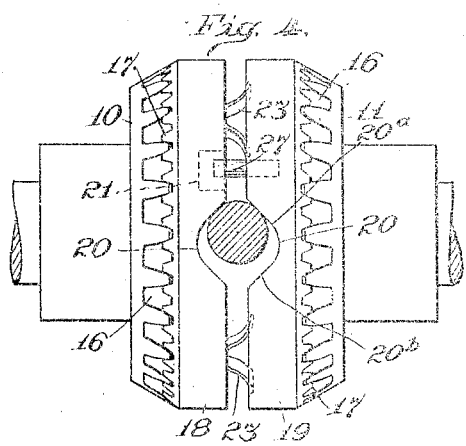
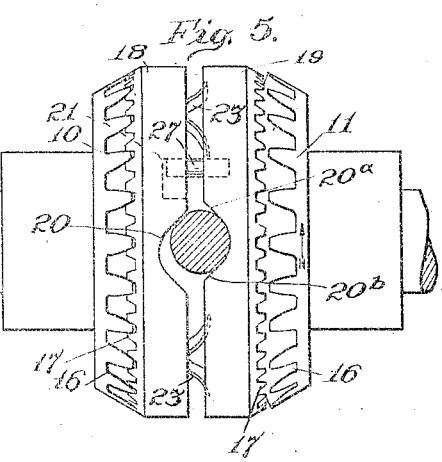
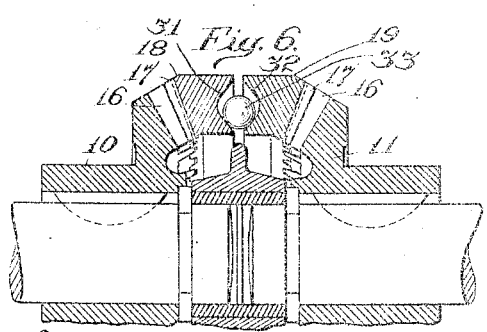
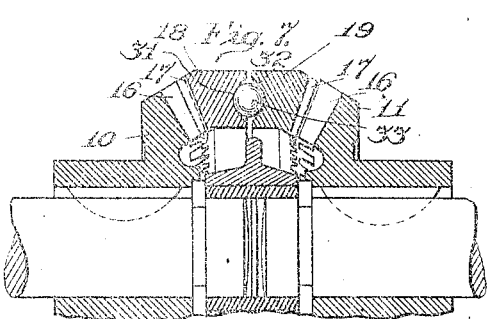

UNITED STATES PATENT OFFICE.

FRANK M. LEWIS, OF CHICAGO, ILLINOIS.

DIFFERENTIAL MECHANISM.

1,292,818.  Specification of Letters Patent.  Patented Jan. 28, 1919.

Application filed March 23, 1916. Serial No. 86,068.

*To all whom it may concern:*

Be it known that I, FRANK M. LEWIS, a citizen of the United States of America, residing at Chicago, in the county of Cook and State of Illinois, have invented certain new and useful Improvements in Differential Mechanism, of which the following is a specification.

My invention relates to improvements in differential mechanism, and the objects of my improvement are, first, the provision of an improved structure of the class whereby power is taken by the driving wheel which offers the greater resistance to rotation, and the consequent distribution of tractive effort in accordance with the road grip of each driving vehicle wheel; second, to obviate the tendency, in compensating devices, of the easier turning vehicle wheel to absorb and waste the power; third, to afford a construction suitable for replacing other types of compensating mechanism; and, further, the production of positive driving means for both driving wheels adapted to instantly disengage from the source of power, run independently and promptly reëngage with the source and give a positive two-wheel drive when the speeds of the driving wheels are equal.

Other objects of my invention will be apparent from a consideration of the following description and claims, in connection with the drawings, in which—

Fig. 3 is a section on line 3—3 of Fig. 1.

Fig. 4 is a plan view of the operative parts in power transmitting of both vehicle wheels.

Fig. 5 is a similar view with the left wheel in power transmitting engagement and the right vehicle wheel disengaged from the source of power and rotating independently.

Fig. 6 is a sectional view of a modified form of the operating parts in driving position, and Fig. 7 is a similar view of the parts with one part in position to run independently.

Similar numerals and letters refer to similar parts throughout the several views.

Figure 1:
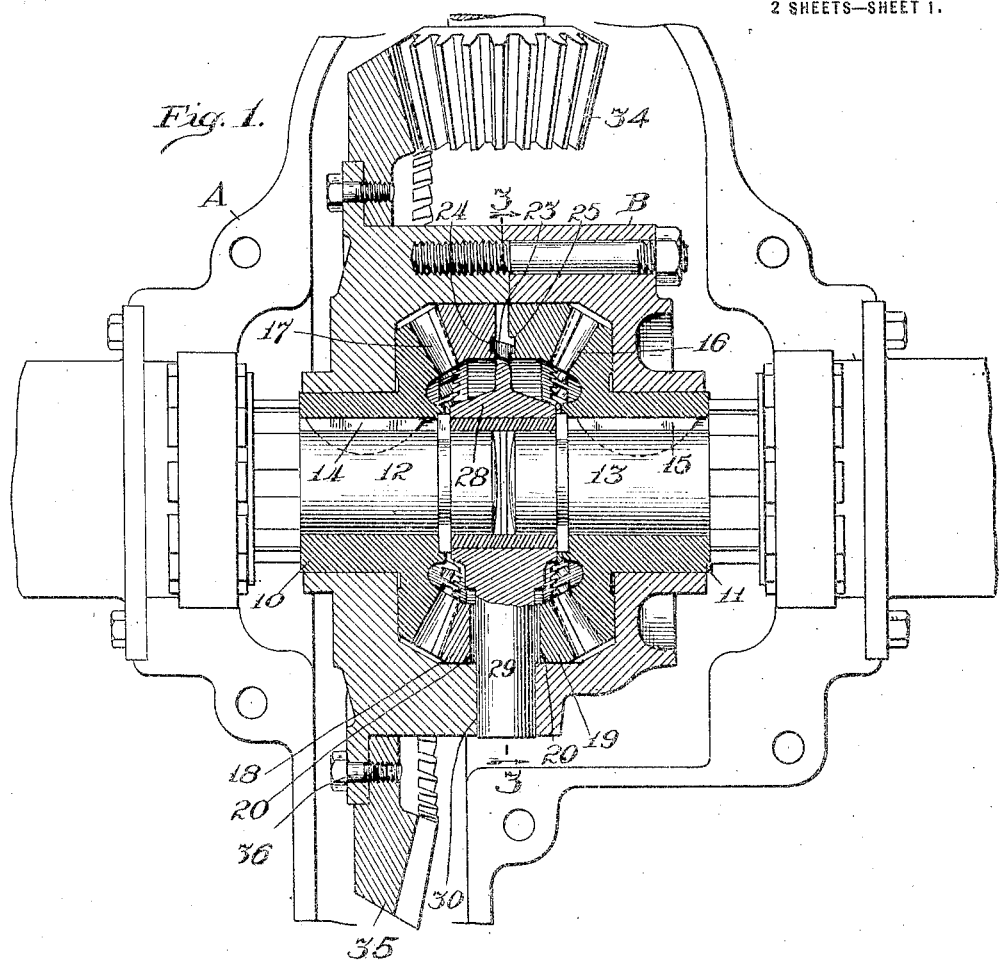
Figure 1 is a longitudinal central section of my differential gear disposed at the meeting ends of the two part axle or shaft of an automobile.
Figure 2:
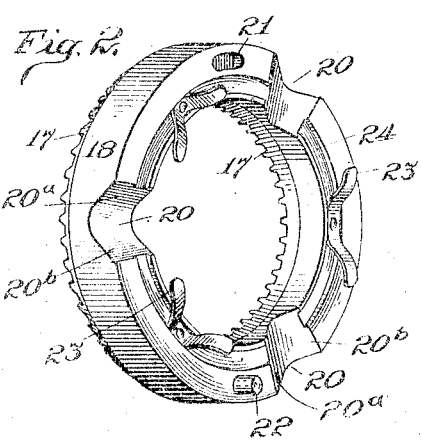
Fig. 2 is a perspective view of a shiftable member.

In the embodiment chosen to illustrate my invention, A denotes a non-rotatable housing of a rear axle of an automobile having a rotatable housing B which incloses differential gearing at the meeting ends of a two-part axle or shaft. The differential gearing comprises driven parts 10, 11 keyed to the axle or shaft parts 12, 13, at 14, 15, each having bevel gear teeth 16 of any suitable or preferred dimensions. In the case of replacement with my improvement the fixed driven parts are retained, but when installed originally at the factory the teeth 16 are preferably made of the size of the coöperating teeth 17 on the shiftable members 18 and 19, which are alike and a description of one is a description of both shiftable members.

The member 18 has cam recesses 20 providing cam faces 20ª 20ᵇ formed in the inner wall thereof; also an elongated recess 21 and carries a pin 22 projecting laterally. Resilient members 23 are suitably secured in concentric grooves 24 in one wall of said member. The shiftable member 19 is similarly formed with teeth 17, on the outer face and cam recesses 20 in the inner face, and concentric grooves 25 and elongated recess 26 and pin 27.

A driver or spider 28 is disposed between the two shiftable members 18, 19, and is formed with trunnions or studs 29 suitable to be inserted in the stud openings 30 in the rotatable housing B.

The chief function of the resilient members 23 is to constantly urge outwardly and into operative engagement the respective members 18, 19, with the respective fixed driven parts 10, 11.

The principal function of the recesses 21, 26 and pins 22, 27 is to limit relative rotative movement of the shiftable members 18, 19, and permit movement of the one toward or from the other.

I do not limit my invention to the employment of the exact construction of resilient members 23, as obviously other means may be used to urge apart the members 18, 19.

In Figs. 6 and 7 I have shown a modified form of means to urge outwardly the shiftable members which consists in forming the adjacent faces of the members 18, 19 with a plurality of recesses 31, 32, and inserting therein balls 33, and omitting the resilient elements 23.

In operation, power is transmitted from the pinion 34 to the gear 35 which is secured at 36 to the rotatable housing B which carries the trunnions or studs 29 thereby through the action of the studs 28 on the cam sides 20ª or 20ᵇ of the recesses 20 forcing outwardly the shiftable members 18, 19 and into power transmitting engagement with the fixed parts 10, 11, and imparting rotation to said shiftable members. When either vehicle wheel exceeds the speed of the other, the driven part on the shaft, whose vehicle wheel exceeds the speed of the other vehicle wheel, will readily overcome the force of the resilient elements 23 and run ahead until the speeds of the vehicle wheels become equal when positive two wheel drive will again be established. This disconnection of the faster running wheel from its driving elements 18 or 19 prevents the idle running or spinning of said wheel by the motor when the opposite or slower running wheel is connected to its driving element, and thus insures the application of the entire power of the motor to the slower running wheel.

The spider or driver having a plurality of arms between and operating against cam faces formed in the adjacent walls of shiftable members is an important feature of my invention. This construction makes possible the employment of my improvement in the smaller automobiles in which the differential mechanism space is limited.

It will be understood that changes, variations and modifications in the details of the invention within the scope of the claims may be resorted to without departing from the spirit or sacrificing any of the advantages thereof.

Having thus fully described my invention, what I claim as new, and desire to secure by Letters Patent, is:

1. In differential mechanism, the combination of a rotatable housing, axle sections entered within the opposite ends of said housing, driven members fast on said axle sections, shiftable members between said driven members each having clutch teeth on its outer side and a plurality of cam recesses in its inner side, and a driver between said shiftable members having radial studs disposed between mating recesses of said shiftable members and at their outer ends secured in said housing.

2. In differential mechanism, the combination of a rotatable housing, axle sections entered within the opposite ends of said housing, driven members fast on said axle sections, shiftable members between said driven members each having clutch teeth on its outer side and a plurality of cam recesses in its inner side, a driver between said shiftable members having radial studs disposed between mating recesses of said shiftable members and at their outer ends secured in said housing, and resilient means positioned between said shiftable members and constantly urging them apart.

3. In differential mechanism, the combination of a plurality of shiftable members each having clutch teeth on one side and a plurality of cam-recesses on the other side, rotatable means disposed in the cam-recesses and between the shiftable members to force them apart, both of the shiftable members having concentric grooves in their opposing faces, and resilient means positioned in the groove of the one the free ends of which are adapted to travel in the groove of the other.

4. In differential mechanism, the combination of a plurality of shiftable members each having clutch teeth on one side and a plurality of cam-recesses on the other side, rotatable means disposed in the cam-recesses and between the shiftable members to force them apart, means positioned between the shiftable members to independently and constantly urge said shiftable members apart, the shiftable members having in their opposing faces an elongated recess and a pin respectively to limit the extent of relative rotative movement of the shiftable members and to permit movement toward and from each other.

5. In differential mechanism, the combination of a rotatable housing, axle sections entered within the opposite ends of said housing, driven gears fast on said axle sections, shiftable members between said driven gears each having clutch teeth on its outer side and a plurality of uniformly spaced cam recesses in its inner side, and a driver between said shiftable members having a hub surrounding the inner ends of said axle sections and radial studs disposed between mating recesses of said shiftable members and at their outer ends secured in said housing.

6. In differential mechanism, the combination of a rotatable housing, axle sections entered within the opposite ends of said housing, driven gears fast on said axle sections, shiftable members between said driven gears each having clutch teeth on its outer side and a plurality of uniformly spaced cam recesses in its inner side, a driver between said shiftable members having a hub surrounding the inner ends of said axle sections and radial studs disposed between mating recesses of said shiftable members and at their outer ends secured in said housing, and means for limiting relative rotary movement of said shiftable members.

7. In differential mechanism, the combination of a rotatable housing, axle sections entered within the opposite ends of said housing, driven gears fast on said axle sections, shiftable members between said driven gears each having clutch teeth on its outer side and a plurality of uniformly spaced cam recesses on its inner side, a driver between said shiftable members having a hub surrounding the inner ends of said axle sections and radial studs disposed between mating recesses of said shiftable members and at their outer ends secured in said housing, means for limiting relative rotary movement of said shiftable members, and resilient means constantly urging said shiftable members into engagement with said driven gears.

8. In differential mechanism, the combination of a plurality of shiftable members each having clutch teeth on one side, and a plurality of cam-recesses on the other side, a two part axle or shaft, driven parts fixed to the adjacent ends of the two part axle or shaft for operative engagement with the respective shiftable members, resilient means positioned between the shiftable members to constantly urge them apart, means to limit relative rotative movement of the shiftable members, a driver disposed in the cam-recesses and between the shiftable members and a rotatable housing in operative relation with said driver.

In testimony whereof I affix my signature in the presence of two witnesses.

FRANK M. LEWIS.

Witnesses:
C. RICHARD BETTS,
SCOTT M. HOGAN.